(12) United States Patent
Dinu et al.

(10) Patent No.: US 12,027,994 B2
(45) Date of Patent: Jul. 2, 2024

(54) DISTRIBUTED CONTROL ARCHITECTURE FOR MOTOR DRIVES

(71) Applicant: Hamilton Sundstrand Corporation, Charlotte, NC (US)

(72) Inventors: Andrei Dinu, Solihull (GB); Rodrigo Fernandez-Mattos, Solihull (GB); Diarmaid John Hogan, Cork City (IE); Sebastian Pedro Rosado, Cork City (IE); Virgilio Valdivia Guerrero, Roquetas de Mar (ES)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 17/564,116

(22) Filed: Dec. 28, 2021

(65) Prior Publication Data
US 2022/0209683 A1 Jun. 30, 2022

(30) Foreign Application Priority Data

Dec. 29, 2020 (EP) .................................. 20275194

(51) Int. Cl.
*H02M 7/537* (2006.01)
*H02M 1/00* (2006.01)
(Continued)

(52) U.S. Cl.
CPC ......... *H02M 7/493* (2013.01); *H02M 1/0009* (2021.05); *H02M 1/0025* (2021.05); *H02M 7/537* (2013.01); *H02P 27/06* (2013.01)

(58) Field of Classification Search
CPC .. H02M 3/1582; H02M 3/1584; H02M 3/285; H02M 3/33561; H02M 7/49;
(Continued)

(56) References Cited

U.S. PATENT DOCUMENTS 4,947,310 A * 8/1990 Kawabata ............. H02M 7/493
363/71
5,212,630 A * 5/1993 Yamamoto ............ H02M 7/493
363/71
(Continued)

FOREIGN PATENT DOCUMENTS

CN 202004680 U 10/2011
CN 109066820 A 12/2018
(Continued)

OTHER PUBLICATIONS

Office Action for European Patent Application No. EP19211205.0, dated Feb. 17, 2022.
(Continued)

*Primary Examiner* — Kevin J Comber
*Assistant Examiner* — Nusrat Quddus

(57) ABSTRACT

There is provided a system for providing (e.g., configured to provide) power to one or more loads. The system comprises a plurality of power converters, wherein each power converter is configured to be arranged in a parallel configuration with one or more additional power converters so as to provide power to the one or more loads. The system further comprises a central controller configured to receive a plurality of local current measurement values from each of the power converters, output a global current measurement value based on the local current measurement values, and transmit the global current measurement value to each of the power converters, wherein each power converter comprises an inverter for receiving an input voltage and converting this to an output voltage having one or more associated output current(s).

19 Claims, 6 Drawing Sheets

(51) Int. Cl.
*H02M 7/493* (2007.01)
*H02P 27/06* (2006.01)

(58) Field of Classification Search
CPC ........ H02M 1/045; H02M 7/006; H02M 7/06;
H02M 7/068; H02M 7/153; H02M 7/10;
H02M 1/088; H02M 7/103; H02M 7/106;
H02M 7/19; H02M 7/08; H02M 7/17;
H02M 2001/007; H02M 7/493; H02M
7/53806; H02M 7/5381; H02M 7/483;
H02M 7/217; H02M 7/538466; H02M
7/5387; H02M 7/53871; H02M 7/53873;
H02M 7/53875; H02M 1/084; H02M
1/0845; H02M 3/073; H02M 3/10; H02M
3/135; H02M 3/137; H02M 3/28; H02M
3/315; H02M 3/3155; H02M 3/325;
H02M 3/335; H02M 7/515; H02M 7/521;
H02M 7/53; H02M 7/537; H02M 7/5383;
H02M 7/53862; H02M 7/757; H02M
7/79; H02M 3/337; H02M 3/338; H02M
3/3382; H02M 3/3384; H02M 7/538;
H02M 7/53832; H02M 7/53835; H02M
7/487; H02M 7/539; H02M 7/23; H02M
7/21; H02M 7/12; H02M 7/04; H02M
7/00; H02J 3/46; H02J 3/38
See application file for complete search history.

(56) References Cited

U.S. PATENT DOCUMENTS

| | | | |
|---|---|---|---|
| 5,257,180 A * | 10/1993 | Sashida | H02M 7/493 |
| | | | 363/71 |
| 5,757,634 A | 5/1998 | Ferens | |
| 6,768,658 B2 | 7/2004 | Perry | |
| 8,188,694 B2 | 5/2012 | Tallam et al. | |
| 9,577,424 B2 | 2/2017 | Campbell | |
| 9,667,152 B2 | 5/2017 | Cao et al. | |
| 9,793,819 B2 | 10/2017 | Ramamurthy et al. | |
| 9,857,812 B2 | 1/2018 | Giuntini et al. | |
| 10,020,759 B2 | 7/2018 | Krolak et al. | |
| 10,454,393 B2 | 10/2019 | Paschedag et al. | |
| 2017/0294864 A1 * | 10/2017 | Tada | H02P 25/22 |
| 2018/0026557 A1 * | 1/2018 | Paschedag | H02P 27/08 |
| | | | 318/445 |
| 2019/0109461 A1 * | 4/2019 | Khajehoddin | H02J 3/40 |
| 2020/0064782 A1 * | 2/2020 | Li | G06N 3/08 |
| 2020/0204057 A1 * | 6/2020 | Kato | H02M 7/53871 |
| 2022/0021323 A1 * | 1/2022 | Hogan | H02J 3/46 |
| 2023/0027564 A1 * | 1/2023 | Hogan | H02K 11/33 |

FOREIGN PATENT DOCUMENTS

| | | |
|---|---|---|
| EP | 2325826 A1 | 5/2011 |
| JP | 2005130599 A | 5/2005 |
| WO | WO-03021503 A2 | 3/2003 |
| WO | WO-2005002037 A1 | 1/2005 |
| WO | WO-2005031939 A1 | 4/2005 |
| WO | WO-2018206085 A1 | 11/2018 |

OTHER PUBLICATIONS

Extended European Search Report for European Patent Application No. EP20275194.7, dated May 19, 2021.
Sanjay, T., et al., "Extended Bandwidth Instantaneous Current Sharing Scheme for Parallel UPS Systems", IEEE Transactions on Power Electronics, Institute of Electrical and Electronics Engineers, USA, vol. 32, No. 6, Jun. 1, 2017 (Jun. 1, 2017), pp. 4960-4969, XP011640910, ISSN: 0885-8993, DOI: 10.1109/TPEL.2016. 2604251 (retrieved on 2017-02-101).

* cited by examiner

DISTRIBUTED CONTROL ARCHITECTURE FOR MOTOR DRIVES

CROSS REFERENCE TO RELATED APPLICATIONS

This application claims priority to and the benefit of European Patent Application No. EP20275194.7 filed Dec. 29, 2020, which is incorporated herein by reference in its entirety.

FIELD

The present disclosure relates generally to a distributed system (or electronic control architecture) for controlling one or more loads. The system comprises a plurality of power converters (e.g., motor drives). The plurality of power converters may be used to power (e.g., control or actuate) one or more loads. The power converters may be arranged in a parallel configuration and could be configured to actuate a single load, or a plurality of loads. In the latter case the output of the power converters could be connected to the loads via a switch that is configured to electrically connect each load with a selected one or more (e.g., a subset) of the plurality of power converters. The power converters could be located on an aircraft and may be configured to power (e.g., control or actuate) one or more aircraft components such as a thrust reverser or landing gear actuator. However the system or architecture disclosed herein is also applicable to ground based applications, such as pumps or other loads. The load could be any type of motor and in such cases the power converters would typically be referred to as motor drives.

BACKGROUND

Electronic control architectures are provided with power converters (e.g., motor drives) that form an electrical circuit which accepts an input (e.g., AC or DC) and generates an output (e.g., AC or DC) of a different voltage. The development of such power converters is a significant part of the development of a new control architecture, program or system. It is envisioned that standardised power converters could significantly reduce development costs, by providing the ability for one or more loads to be controlled using multiple power converters.

However, existing solutions do not fully address the needs for paralleling power converters, in particular for modular and/or multiplexed systems.

SUMMARY

To facilitate wide power requirement ranges of the one or more loads, it may be necessary to use a plurality of power converters operating in parallel. Mutualised or multiplexed power converter architectures become more relevant as the number of electronic components increases. This is the case, for example, in the aircraft industry as more electronically controlled components are used.

In such systems, a plurality of power converters may be interfaced to electrical loads through a switch that can reconfigure the connection between electrical loads and power converters. In the case of an aircraft, certain loads may not be used simultaneously during a flight or at the same point in time, such as a landing gear actuator and thrust reverser actuator. As such, these components can in theory be powered by the same power converter, with the switch reconfiguring the connection accordingly.

FIG. 1 illustrates some example of power converter (in this case motor drive) systems and how they might be connected to loads. The graph on the left-hand side illustrates the power requirements of the loads 1, 2 and 3, showing that at any point in time the loads do not simultaneously require power.

The first example 1 includes four motor drives connected to three loads, wherein motor drives 1 and 2 are connected in a simple manner to a respective load each. Motor drives 3 and 4 are connected in a slightly more complex manner, such that their outputs are combined and used to drive a single load.

The second example 2 includes just two motor drives connected in a multiplexed manner to the same three loads of the first example 1. Due to the use of a switch the two motor drives are able to power the three loads to the same extent as the four motor drives of the first example 1.

The benefit of a combined or multiplexed approach is the potential reduction of weight and increase of drive availability compared to conventional architectures.

To take the maximum advantage of the combined or multiplexing concept (in particular the latter), paralleling control architectures for motor drives is a critical technology, which enables large loads to be powered by the parallel connection of multiple drives. This avoids having to dimension one motor drive for maximum load power, for example.

Solutions for providing parallel motor drives should be aimed at reducing weight, for example of the various components used within the architecture. It has also been found that the use of scalable and modular solutions may be important in enabling motor drive inverters to operate in standalone or a parallel configuration to a variable number of motor drives (e.g., two or more drives in parallel). The aim of the present invention, as discussed in more detail below, is to achieve this without significant need for reconfiguration of the control architecture.

The operation of motor drives in parallel presents operating challenges due to the interconnection of multiple switching elements in parallel, and the potential circulating current flow paths that are not present in standard single drive and single load configurations. An illustration of these circulating current flow paths is shown in FIG. 2.

FIG. 2 shows a distributed control architecture 10 including a plurality of (in this case two) motor drives 20 that are operatively connected to one or more loads, in this case a motor 12. That is, the motor drives 20 may be configured to power the motor.

In the arrangement shown in FIG. 2 the control of the motor drives 20 is almost entirely distributed (i.e., located locally to each motor drive), with only a central speed controller being provided that regulates the motor speed and current set-points for modulation. The distributed system may use synchronous reference frame control, which is known in the art (also called "d-q control"). Using such a control mechanism, the voltage and current can be converted into a reference frame that rotates synchronously with a voltage vector (e.g., by Park Transformation) so that three-phase time-varying signals are transformed into DC signals.

Each motor drive 20 comprises a local control 22 (e.g. processor or circuitry) configured to regulate the internal current of the motor drive 20 as well as provide the suitable modulation signals to provide a controlled commutation of the output voltages of the motor drives 20 in parallel operation.

The solution of FIG. 2 is modular and scalable, but includes some limitations. For example, there is at least some interaction between the current controllers of the individual motor drives 20, which can significantly limit bandwidth. In addition, circulating currents may be created between each motor drive 20 due to tolerances in current sensors connected between the controllers 22 and a respective motor drive 20.

To address these issues, large output magnetics in the form of interphase power transformers ("IPTs") can be used instead of individual inductors for each output voltage phase. These exhibit low impedance between the motor drive and the load, but high impedance between motor drives. As a result, circulating currents between the motor drives can be minimised, and dynamic limitations in the (current) control loop addressed.

FIG. 3 illustrates how interphase power transformers 30 ("IPT") could be combined with two motor drives 20, wherein it can be seen that the phases of each motor drive 20 are intermixed with each other through a dedicated IPT 30.

However, IPTs are typically very heavy. Also their implementation in a multiplexed system may be undesirable, since the motor drives in such systems typically operate in a stand-alone configuration, or paralleled with a variable number of motor drives. As such, a large number of IPTs may be required, which presents significant complexity and weight issues.

The use of a centralised current reference shared to the distributed controllers is shown to improve the performance of a distributed, paralleled system. Different approaches have been proposed to calculate the reference with the purpose of improving the overall performance.

For example, Chinese Utility Model No. 202004680 (which is incorporated by reference herein in its entirety) discloses a sine wave inverter parallel system with variable current ratio. This uses the average of the current demand calculated by external voltage control loops as current reference. However, having the same reference does not completely solve the issue.

To improve current sharing between parallel inverters, the method in U.S. Pat. No. 9,667,152 uses a current sharing bus that averages all the output currents from individual converters. The average and local currents are used to calculate a sharing error whose magnitude is then used to adjust the duty cycle of modulation. A similar approach is followed in U.S. Pat. No. 6,768,658 (incorporated by reference herein in its entirety), which combines a sharing bus signal with a local current measurement in converter current control loops, to correct deviations from the central/common current set point.

FIG. 4 shows a slightly different solution to that of FIG. 2, in which a master or central controller 50 may be used, for example as part of a central controller platform/circuitry that is physically separate to the individual motor drives 20. The central controller 50 may be configured to provide suitable modulation signals to the various motor drives 20. This centralised solution is not sensitive to tolerances of local current sensors, as may be the case with the arrangement shown in FIG. 2. In addition, circulating currents can be minimised since the solution allows improved synchronisation between the motor drives 20.

A prior example can be found in U.S. Pat. No. 8,188,694 (incorporated by reference herein in its entirety), presents a solution based on the central control that is configured to compute modulation signals using optical cables, which can reach a high degree of synchronisation. In U.S. Pat. No. 5,757,634 (incorporated by reference herein in its entirety), a master controller regulates the total load current, producing a modulation reference signal. In other words, the central controller executes a current control loop. The computed modulation signal is then locally modified at each motor drive based on a difference between the expected current share and real current. If the master controller fails, a slave controller takes its place. A similar method is followed in U.S. Pat. No. 9,857,812, in which all of the paralleled motor drives receive a common modulation signal that is modified at local controllers in order to obtain good current sharing among the paralleled motor drives.

Solutions that are based on a central controller suffer from lack of flexibility and scalability. That is, you cannot easily transition between using 2, 3, 4 or more power converters, for example. If this scheme was required in a multiplexed control system, the central controller would require to be reconfigured depending on the specific hardware configuration (e.g., parallel or non-parallel operation). Furthermore, all multiplexed power converters would depend on the central controller and would require high bandwidth communications even to operate in stand-alone operation. In addition, unless special measures are taken, the central controller may become insensitive to local deviations or asymmetries. This could represent additional risks for the paralleled power converter operation.

In accordance with an aspect of the present disclosure, there is provided a system for providing (e.g., configured to provide) power to one or more loads.

The system comprises:
- a plurality of power converters, wherein each power converter is configured to be arranged in a parallel configuration with one or more additional power converters so as to provide power to the one or more loads; and
- a central controller configured to receive a plurality of local current measurement values from each of the power converters, output a global current measurement value based on the local current measurement values, and transmit the global current measurement value to each of the power converters, wherein each power converter comprises:
- an inverter for receiving an input voltage and converting this to an output voltage having one or more associated output current(s);
- circuitry configured to output a local current measurement value for transmission to the central controller, wherein the local current measurement value is based at least in part on the output current value(s) of the inverter; and
- a module configured to modulate the output voltage of the inverter using one or more modulation schemes, wherein the modulation module receives a local voltage reference as an input, wherein the local voltage reference is based on (e.g., scaled with) the global current measurement value such that the modulation module is configured to regulate the output current(s) of the inverter based on the global current measurement value.

The above features, in particular using a local current control loop (rather than this being centralised) leads to a more scalable and less complex system than those described above. There is no need to reconfigure the central controller when connecting different numbers of power converters to a load, for example.

The power converters may be motor drives, and the one or more loads may be or comprise one or more motors. The technical effects described above are seen as particularly applicable to such implementation, although the present disclosure is not limited as such and may be applied to any type of power converter or load.

The input voltage may be a DC input voltage.

The output voltage may be a three-phase output voltage.

Each local current measurement value may be transmitted to (e.g., shared with) the central controller to facilitate operation of the parallel configuration of power converters, wherein the global current measurement value may be used to regulate the output current(s) of each power converter locally, and such that the power converters in the parallel configuration act together to provide power to one or more loads.

That is, the control loop and modulation module of each power converter may combine to regulate the output current (s) of the respective power converter, wherein each local current measurement value is transmitted to the central controller, which calculates the global current measurement using the local current measurements. The global current measurement value is then transmitted back to each power converter, and is subsequently used by local current control loop to generate a voltage reference for the modulation module which regulates the output current(s) as aforesaid.

The global current measurement value may correspond to a summation of the local current measurement values, or the global current measurement value may correspond to an average of the local current measurement values.

Each modulation module may be configured to generate appropriate switching signals for the respective inverter of each power converter to provide a controlled commutation of the output voltages thereof.

Each modulation module may be configured to send the switching signals to the inverter so as to control the timings of the output voltages in use.

The generation of the switching signals for the inverters by each respective modulation module may be generated based on the local voltage reference, itself based on (e.g., scaled with) the global current measurement value.

Each modulation module may adjust the duty cycles of modulation for each respective power converter, based on the global current measurement value, to regulate the output current(s).

Generally, the modulation module may be configured to adjust a modulation duty cycle based on the variation in the global current measurement value in use.

Each power converter may be a single power converter and the circuitry/components thereof are located on a single circuit board. This improves the scalability and ease of use. In a refinement, the circuit boards holding the power converters may comprise a common interface for communicating with the central controller.

The system may further comprise a structure configured to receive and hold multiple of the circuit boards holding the power converters, wherein the structure may be configured to connect any circuit boards held and received within the structure to the central controller, such that a variable number of power converters may be connected to the central controller using the structure as desired. This provides a system that is very easily modular and scalable, and can be easily adapted for different loads whilst using, e.g., a common interface.

The structure may be configured such that a single power converter can be connected thereto for providing power to one or more loads in a standalone configuration, as well as up to N power converters connected thereto for providing power to one or more loads in a parallel configuration, wherein N is an integer greater than 1.

Each power converter may comprise one or more sensors for measuring and/or determining the current values of the inverter output voltages, for use in the local current control loop.

Each power converter may be configured to convert the current values of the inverter output voltages to a synchronous reference frame current for use in the local current control loop.

Unless otherwise indicated, the various method steps, functional elements, stages, "modules" and "means" of the disclosure (e.g., the system and structure described above) may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

The various method steps, functional elements, stages, "modules" and "means" of any aspects or embodiments of the present disclosure (e.g., the system and structure described above) may be implemented at least partially using software, e.g., computer programs.

It will thus be seen that when viewed from further aspects the present disclosure provides computer software specifically adapted to carry out the method steps, functional elements, stages, "modules" and "means", etc., herein described (e.g., the system and structure described above) when installed on data processing means, a computer program element comprising computer software code portions for performing the methods herein described when the program element is run on data processing means, and a computer program comprising code means adapted to perform all the steps of a method or of the methods herein described when the program is run on a data processing system.

The software or computer system adapted to carry out the method steps, functional elements, stages, "modules" and "means" of any aspects or embodiments of the present disclosure (e.g., the system and structure described above) may be implemented on a single device.

BRIEF DESCRIPTION OF THE DRAWINGS

Various embodiments will now be described, by way of example only, and with reference to the accompanying drawings in which.

DETAILED DESCRIPTION

Herewith will be described various embodiments of a distributed system (or electronic control architecture") for controlling one or more loads. The system comprises a plurality of power converters (e.g., motor drives). The power converters may be used to power (e.g., control or actuate) one or more loads. The power converters may be arranged in a parallel configuration and could be configured to control or actuate a single load, or a plurality of loads. In the latter case the output of the power converters could be connected to the loads via a switch that is configured to electrically connect each load with a selected one or more (e.g., a subset) of the plurality of power converters. The power converters could be located on an aircraft and may be configured to power (e.g., control or actuate) one or more aircraft components such as a thrust reverser or landing gear actuator. The components may not require power at the same time or concurrently.

An architecture for controlling/actuating one or more loads is disclosed in accordance with various embodiments, wherein the architecture comprises a plurality of power converters (e.g., motor drives) that are operatively connected to one or more loads. The power converters may be configured to control (e.g., power, actuate or otherwise move) the one or more loads. The loads may be or comprise an actuator and/or motor, although the disclosure is not limited as such and the loads could be any suitable load that can be powered by a plurality of power converters. The various components of the architecture, including the power converters (e.g., motor drives), loads and actuators, may be electronically controlled.

The power converters may be connected in a parallel configuration, such that a plurality of power converters may be used to actuate the same load. In this manner, a plurality of power converters may be provided that are used to actuate a single load (see, e.g., FIG. 5), or a plurality of power converters may be provided that are configured to actuate multiple loads. In the latter case, a switch may be configured to select the power converter(s) from the plurality of power converters and operatively connect the selected power converters to each respective load. The switch may be configured so that only one load is being driven by the plurality of power converters (e.g., a selected one or a subset thereof) at a particular time. The plurality of power converters may be powered by the same power supply and each may include a power inverter.

Figure 5:
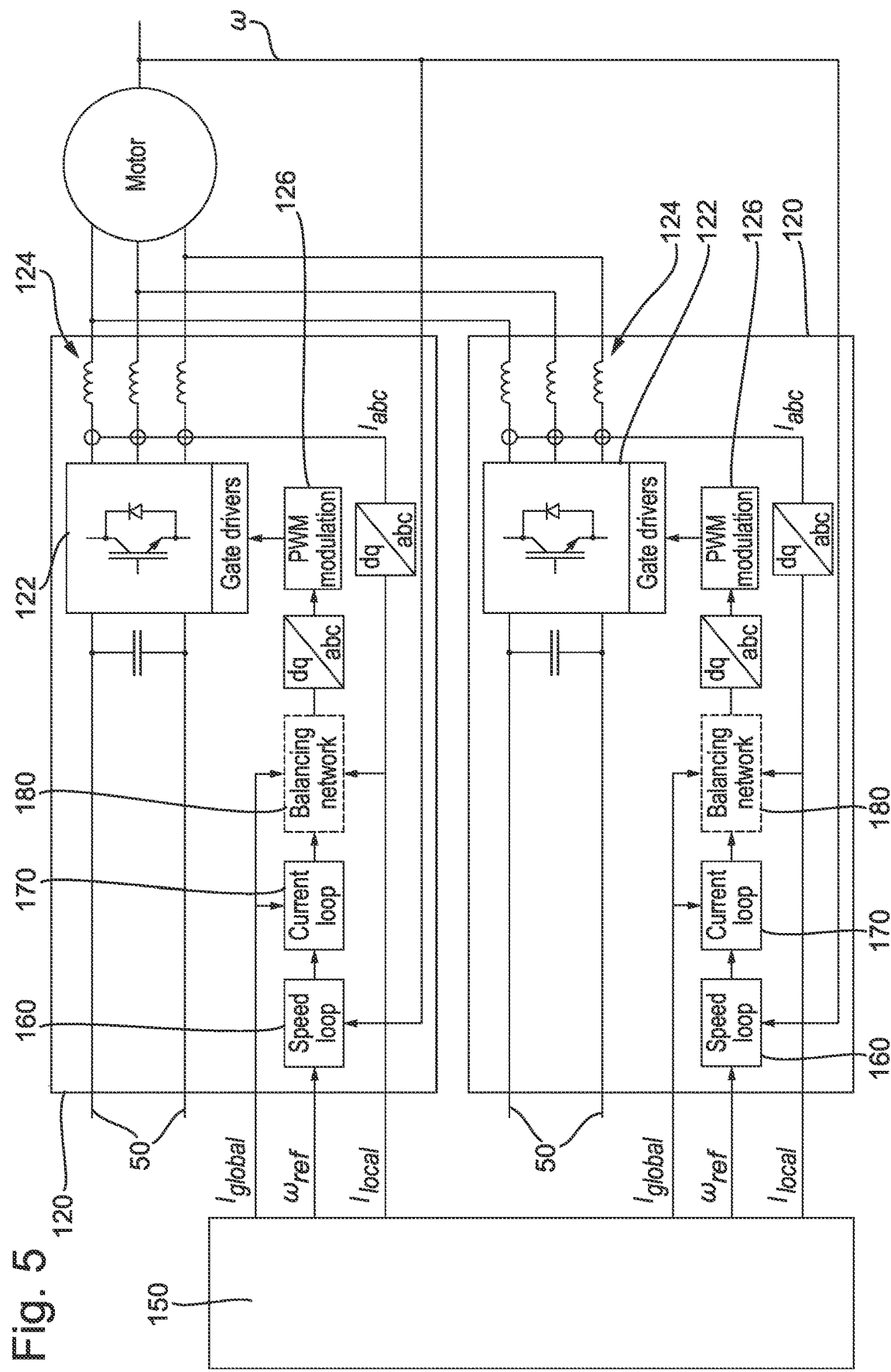
FIG. 5 shows a distributed system in accordance with various embodiments.

FIG. 5 shows a distributed system 100 in accordance with various embodiments.

The system 100 comprises a plurality of power converters (e.g., motor drives) 120 that may each include an inverter 122 and output inductors 124. The motor drives 120 may each receive DC power via input terminals 50 (e.g., from a common power supply). This may then be converted by the inverter 122 into an output voltage (e.g., a three-phase AC voltage) for actuating a load via inductors 124. Two motor drives 120 are shown in FIG. 5, but more could be provided as required, and as discussed herein.

It will be appreciated that references to motor drives in accordance with various embodiments could refer to any type of power converter, and the broadest aspects of the present disclosure are not intended to be limited to using motor drives, or providing a load in the form of a motor.

The plurality of motor drives 120 typically need some sort of common or centralised operation (e.g., control system) for example to synchronise their operation. Accordingly, the motor drives 120 may be controlled centrally using a central controller 150 (e.g., processor or circuitry) or global communication module. The central controller 150 may be configured to control, for example, which motor drive(s) 120 are to be used (e.g., selected as discussed above) at a particular time. The central controller 150 may achieve this by switching between the motor drives (e.g., the power inverters thereof) using, e.g., a modulation scheme or technique.

Generally, the presently disclosed technology combines the use of local current controllers (e.g., current control loops) and a central or global controller (e.g., the central controller 150 in FIG. 5). The local current controllers (e.g., circuitry thereof, which may utilise one or more algorithms) are configured to receive current values associated with each output voltage phase of the inverter 122 (e.g., measured at an output of each inverter 122 and optionally presented in a synchronous reference frame or "d-q system"), which correspond to a local current measurement $i_{local}$ for each of the motor drives 120 to be transmitted to the central controller 150.

Each motor drive 120 may include components or circuitry that form a speed loop 160 having as an input a reference speed cu r d and also a motor speed $\omega_m$ (which may be measured or calculated). The reference speed cu r d would typically be given to all power converters operating in parallel, and could be set by the central controller 150 or elsewhere (e.g., a flight control computer, or other component or module, e.g., having another control loop). For example, a flight controller may be commanding that a component moves by actuating to a certain position at a given speed. The speed loop 160 is configured to generate a suitable reference (e.g., current reference), which is then input into a current loop 170 (described below) to regulate the output current of the motor drive, in effect regulating the speed of rotation of the motor.

Although speed loops such as this are known in the art, the technology disclosed herein means we can retain this control while integrating a parallel system. A speed loop 160 is not essential, however, for example in cases where the load is not a motor, or the rotational speed of the motor does not otherwise require regulation.

Each motor drive 120 comprises a (local) current control loop 170 that is configured to regulate the output current of the respective motor drive 120, so as to ensure the motor drives 120 operating in parallel work together adequately and effectively. That is, to generate the correct voltage reference values for modulation, such that the output current of each motor drive 120 is regulated locally (but based on a global current measurement as described herein).

The central controller 150 is configured to determine or calculate a global current measurement $I_{global}$ based on the local current measurement $I_{local}$ from each of the paralleled motor drives 120. The global current measurement $I_{global}$ may be an average or sum of the local current measurement $I_{local}$. The global current measurement $I_{global}$ is then transmitted back to each local motor drive 120, to be used as an input to the current loop(s) 170, which are configured to generate a voltage reference based on the global current measurement $I_{global}$. This voltage reference is then transmitted to the modulation module to be used as part of the modulation (e.g., to generate suitable modulation duty cycles), as described in more detail below. For example, the modulation elements may generate a suitable switching pattern for the inverters 122 based on the voltage reference.

An optional balancing network 180 may be used within each motor drive 120 that can form a supplementary element of the local control scheme. The balancing network 180 may be configured to adjust the voltage reference further, based on the local output currents of the respective inverter 122. This can help to alleviate differences in output currents between the motor drives 120.

Any suitable method or type of modulation may be employed in the present disclosure. In particular, the modulation may comprise pulse width modulation ("PWM") such as space vector modulation ("SVM"). Each motor drive 120 may include a modulation module 126 configured to control the synchronisation of the motor drive 120, for example the synchronisation of a switching frequency of the modulation, e.g., using PWM or SVM.

The modulation (e.g., PWM or SVM) module 126 is configured to generate the appropriate signals (e.g., logic and/or switching signals) for the inverter 122 of the motor drive 120 (e.g., gate drivers thereof) to provide a controlled commutation of the output voltages thereof, whilst regulating the output voltages/currents of each inverter 122 to maintain consistency between the motor drives 120. Thus, the modulation module 126 may be configured to send suitable such signals to the inverter 122 that control the timings associated with the respective motor drive 120 (e.g., the output voltages thereof) in use. Generation of the switching signals for the inverters 122 by each respective modulation (e.g., SVM) module 126 is facilitated by the use of the global current measurement $I_{global}$ and voltage reference.

Each motor drive 120 may be a single power converter and the circuitry/components thereof may be located on a single circuit board (e.g., a single printed circuit board or "PCB"). The circuit boards (or "blades") holding the motor drives 120 could be similar (or substantially identical), such that they comprise the same interface for communicating with the central controller 150. In this manner, the motor drives 120 could be easily scaled (e.g., from using two motor drives 120 to using three or more) without any modification of the motor drives 120 or central controller 150.

A rack or similar structure could be used to connect a variable number of (e.g., between 2 and 20) motor drives 120 to the central controller 150, in a similar manner to server racks, into which server blades can be inserted and removed easily depending on system requirements.

The current values of the three phases (i.e., the instantaneous inverter 122 output currents) may be measured and/or determined for use in the circuitry of the motor drive 120 and (optionally) as part of the balancing network 180. Suitable components or circuitry may be configured to determine the output currents. The output currents (e.g., phase currents) could be measured and/or determined using a current sensor, although any suitable technique could be used, with optionally a current sensor provided for each of the three phases.

The distributed system 100 may use synchronous reference frame control, which is known in the art (also called "d-q control"). Using such a control mechanism, the voltage and current can be converted into a reference frame that rotates synchronously with a voltage vector (e.g., by Park Transformation) so that three-phase time-varying signals are transformed into DC signals. Using "d-q currents" provides a convenient way of representing the output current of the motor drive, and analysing the system.

The distributed system 100 of the present disclosure is able to replicate the dynamic performance capabilities of a centralised current control structure (discussed above with reference to FIG. 4). The centralised current control structure of the FIG. 4 arrangement allows for design of the current controllers without any additional dynamic performance limitations, along with the inclusion of low inductance output filters. It can be shown that the transfer functions of the distributed system 100 of the present disclosure (e.g., FIG. 5) result in similar dynamic performance, but avoiding the limitation of the centralised current control structure of the FIG. 4 arrangement (and similar conventional arrangements).

What has been found is that the use of a central controller of some sort is useful, but can be quite complex, especially in terms of allowing modularity and scalability. This is not easy to achieve with conventional arrangements for reasons discussed above. The distributed system 100 of the present disclosure enables similar dynamic qualities that are advantageous, but also reduces complexity and provides a system that is both modular and scalable.

Figure 1:
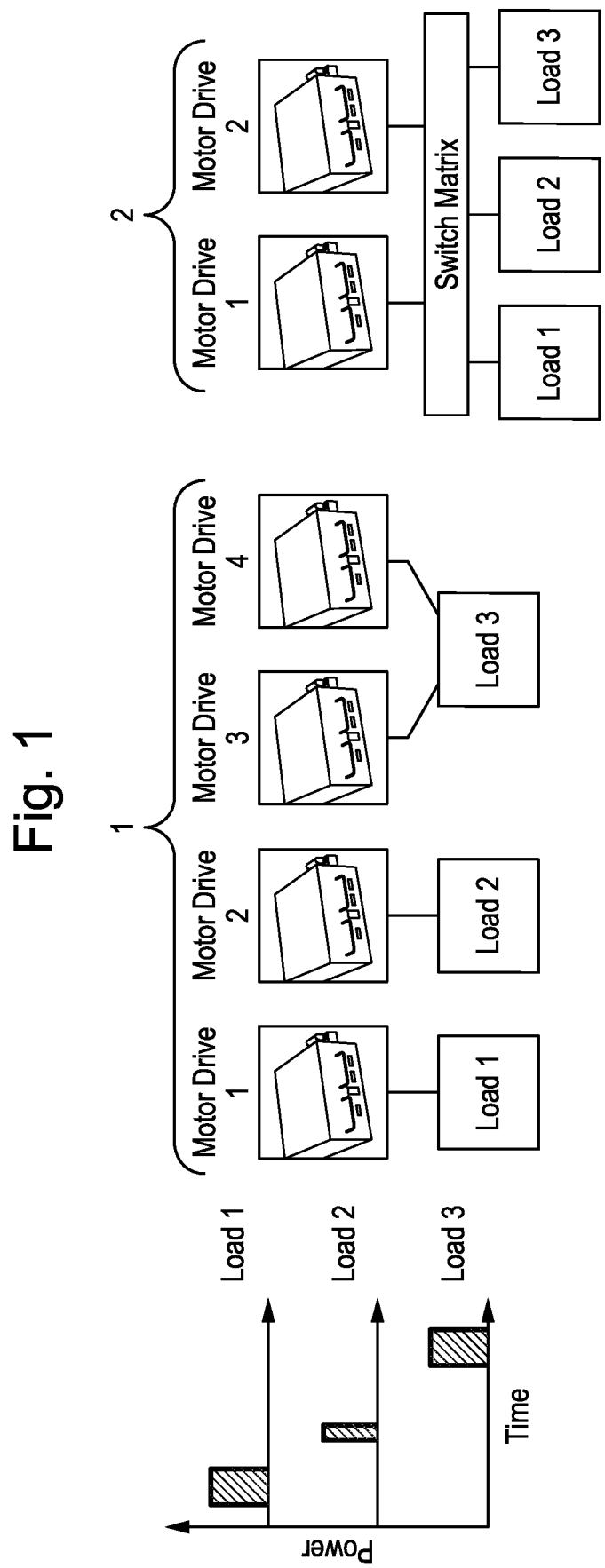
FIG. 1 illustrates some examples of power converter (in this case motor drive) systems and how they might be connected to loads.
Figure 2:
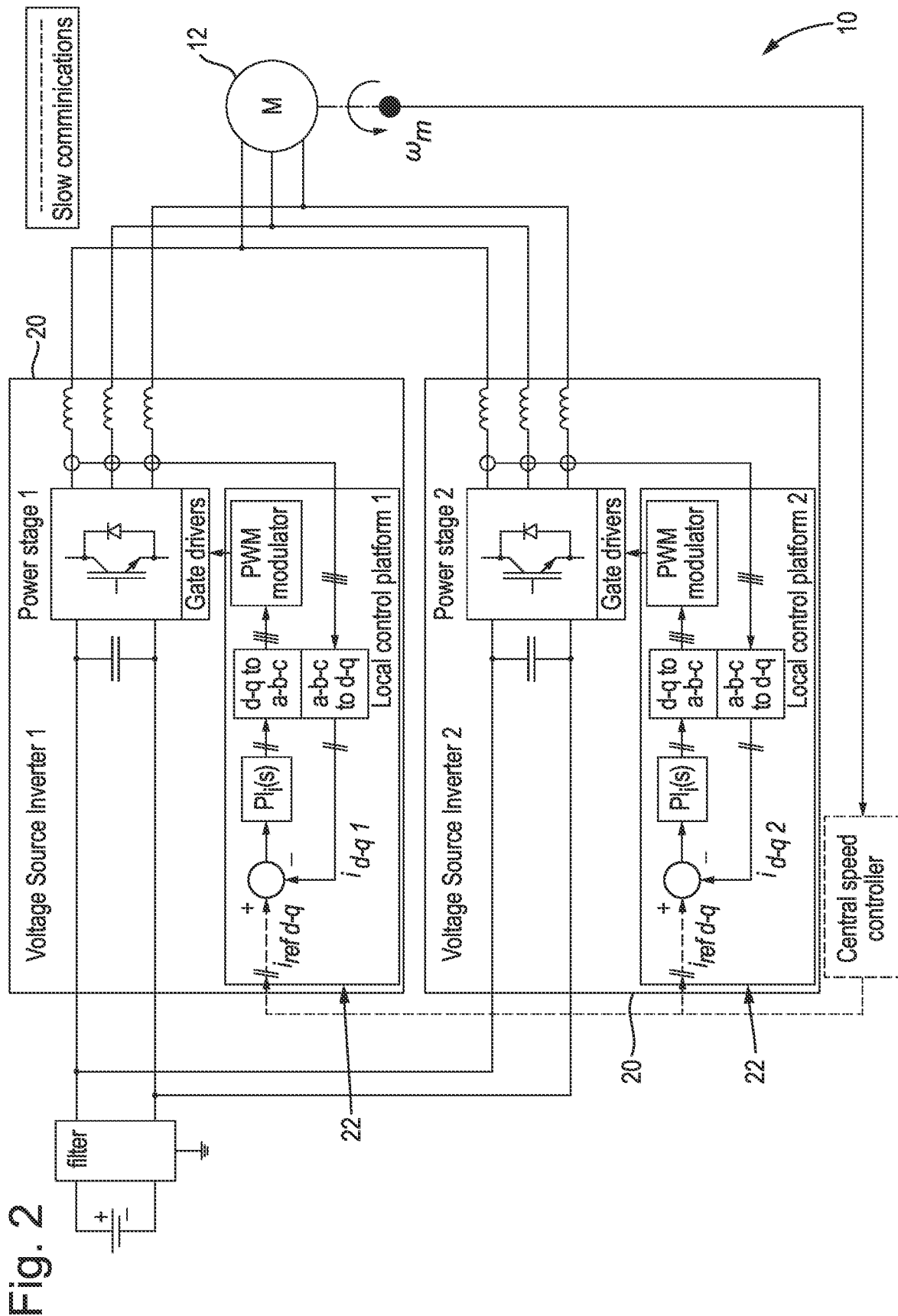
FIG. 2 shows a distributed control architecture including a plurality of (in this case two) motor drives that are operatively connected to one or more loads, in this case a motor.
Figure 3:
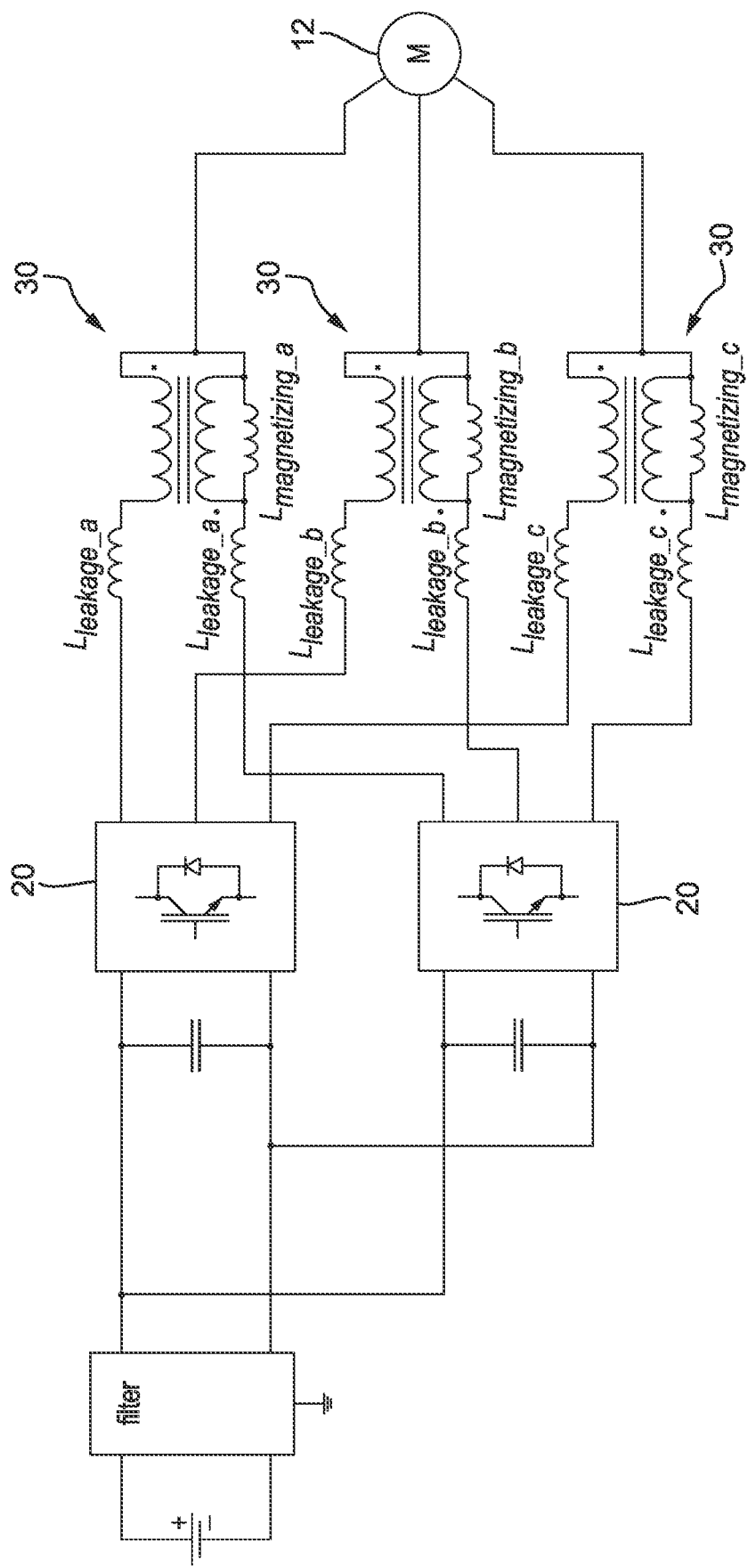
FIG. 3 illustrates how interphase power transformers ("IPT") could be combined with two motor drives.
Figure 4:
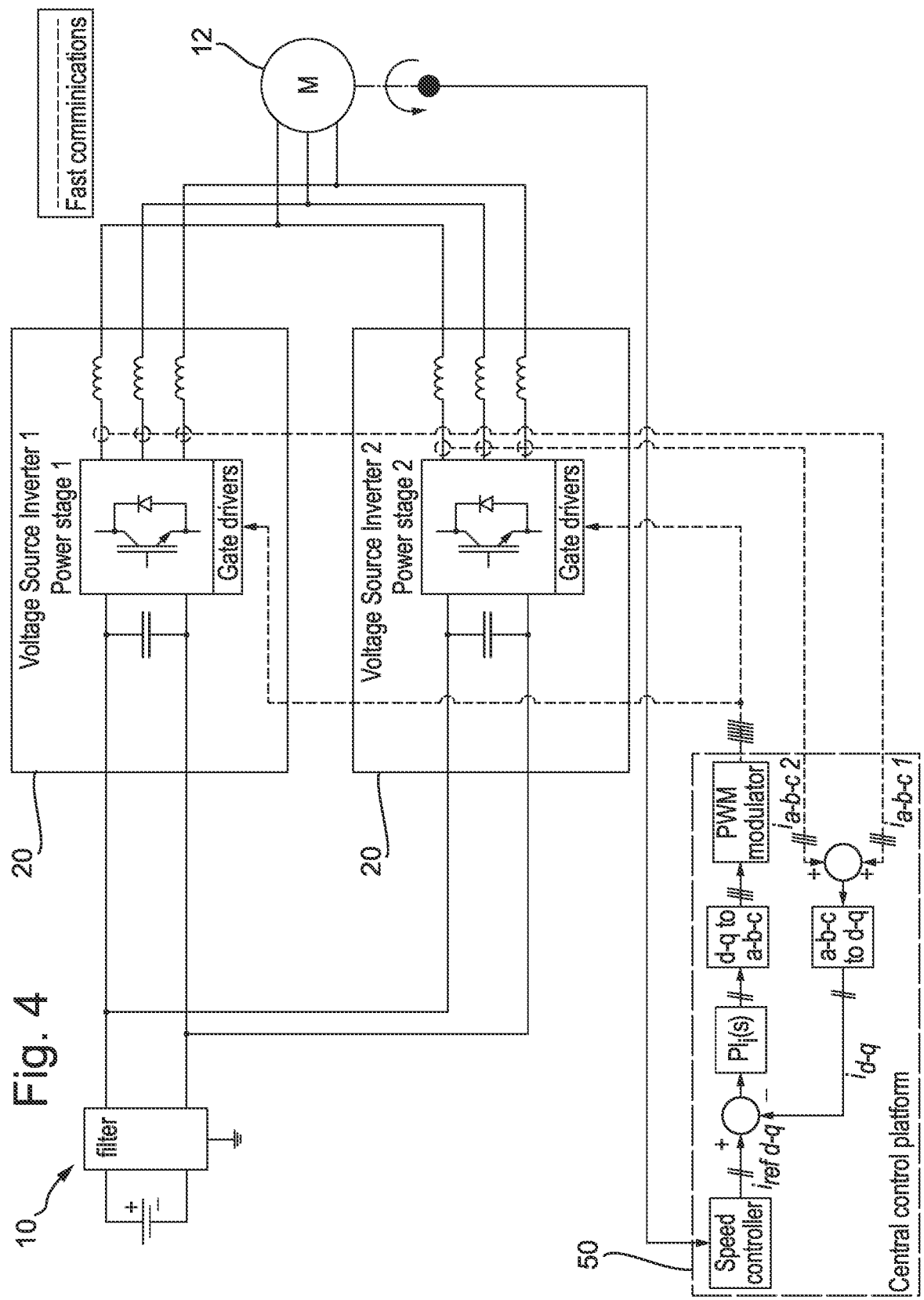
FIG. 4 shows a slightly different solution to that of FIG. 2, in which a master or central controller is used that is physically separate to the individual motor drives.

In other words, from a dynamic standpoint, the technology disclosed herein is similar to the arrangement of FIG. 4, in that a central controller is used. However, each motor drive 120 has a local controller incorporating a current control loop 170, rather than this particular aspect being centralised as with the arrangement of FIG. 4. This brings the benefits of scalability and reduces complexity as described above, in that each motor drive 120 can operate independently or paralleled with any number of other drives 120. In the latter case, there is no need using the technology of the present disclosure to reconfigure the control system, since the current control loop is kept local to each motor drive 120. This significantly reduces complexity, and in certain applications may simplify qualification or certification efforts.

As shown in FIG. 5 there may be a conventional speed controller (speed loop 160) implemented on each local motor drive 120, where the speed controller is configured to generate a current reference, which the current loop 170 acts upon to regulate the output current of the motor drive 120, in effect regulating the speed of rotation of the motor. The speed reference $\omega_{ref}$ is specified from the central controller 150 or central communication element, and is the same for all motor drives 120 operating in parallel.

As noted above the use of the balancing network 180 is not essential to the operation of the control architecture disclosed herein, although it can help to improve current load sharing between parallel motor drives 120 by adjusting the voltage reference sent to the modulation module so as to modify the generation of the modulation signals and modify the output voltage of the respective motor drive 120. The balancing network may be configured to adjust the voltage reference for each local motor drive 120, such that the output currents from the inverter are balanced across the motor drives 120.

The dynamic similarity of the system 100 disclosed herein can be demonstrated through analysis of the transfer functions of single line diagrams of the system architectures. The architecture of the system 100 allows for the design of local current control loops, which has been validated experimentally through comparison of a theoretical closed-loop transfer function for the controllers against the experimental transfer function.

Figure 6:
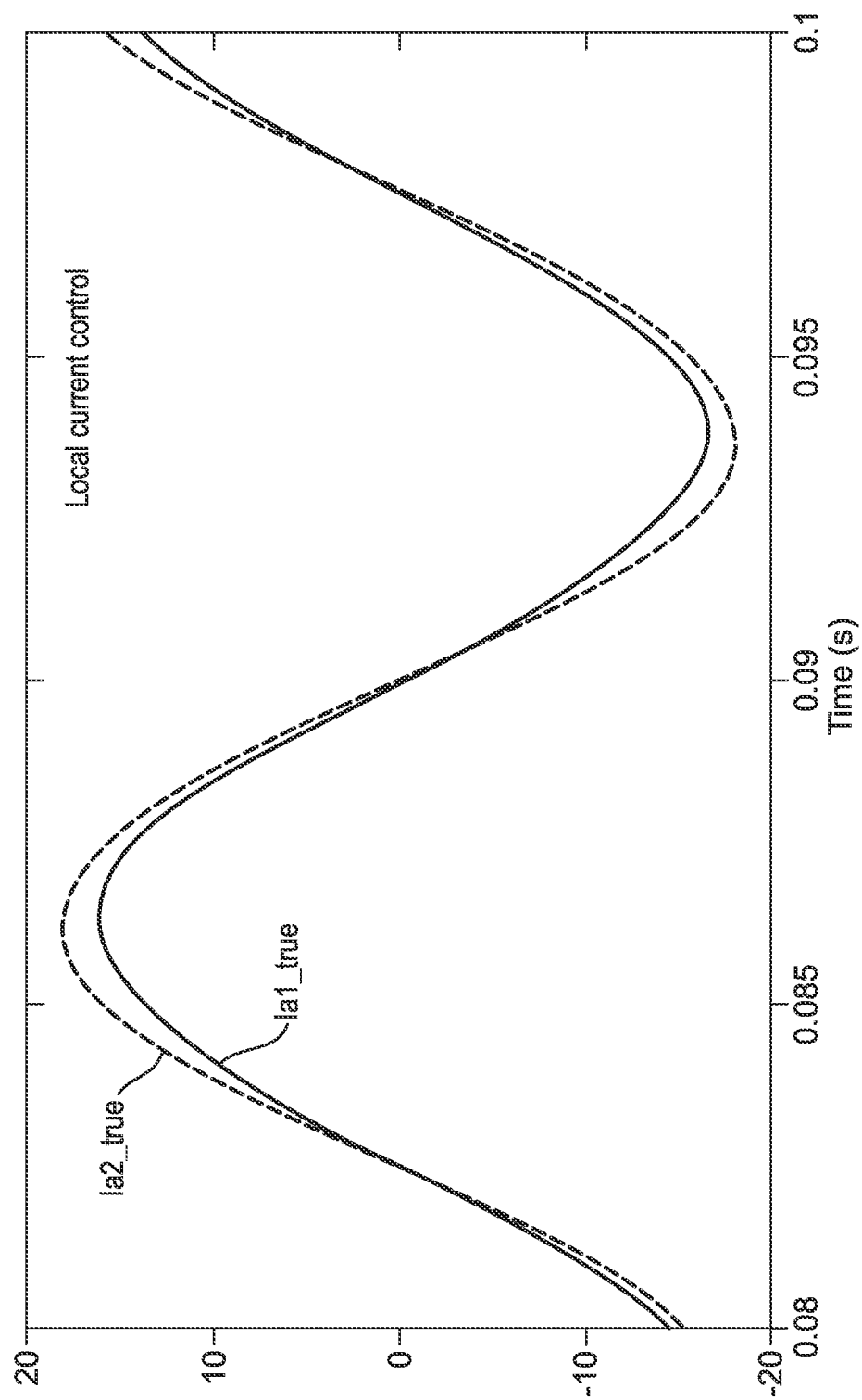
FIG. 6 shows a graph illustrating the effectiveness of the presently disclosed technology.

Extensive experimental analysis was carried out to demonstrate the performance of the control scheme for parallel motor drive operation. Two phase current waveforms are shown in FIG. 6, which provides experimental results demonstrating the synchronous operation of two motor drives in parallel. These results demonstrate the parallel control architecture presented in this disclosure can facilitate successful operation of multiple power converters in parallel, and operating at low output inductances (a key requirement to reduce system weight).

The technical effects of the presently disclosed technology as compared to the state of the art includes weight reduction, reduced complexity and improvements in performance. A weight reduction is achieved by allowing improved paralleling of power converters, for example since heavy interphase power transformers (IPTs) are not required. The proposed control technique has particular utility for multiplexed systems because the same control architecture can be used for stand-alone operation of one power converter, and for parallel operation of two or more power converters. Similar solutions from a dynamic standpoint, such as the central control solution, require control reconfiguration and potentially more communication channels. This ultimately impacts on reliability, cost and increases certification requirements. The proposed technology also allows faster control of machine current. That is, the same current control bandwidth as with stand-alone inverter operation can be achieved. The conventional arrangements described above do not achieve the same effects. The technology disclosed herein has benefits attributed to both techniques.

Although the present disclosure has been described with reference to various embodiments, it will be understood by those skilled in the art that various changes in form and detail may be made without departing from the scope of the invention as set forth in the accompanying claims.

The invention claimed is:

1. A system for providing power to one or more motors, comprising:
    a plurality of power converters, wherein each power converter is a motor drive configured to be arranged in a parallel configuration with one or more additional power converters so as to provide power to the one or more motors; and
    a central controller configured to receive a plurality of local current measurement values from each of the power converters, output a global current measurement value based on the local current measurement values, and transmit the global current measurement value to each of the power converters,
    wherein each power converter comprises:
    an inverter for receiving an input voltage and converting this to an output voltage having one or more associated output currents;
    circuitry configured to output a local current measurement value for transmission to the central controller, wherein the local current measurement value is based at least in part on the one or more output currents of the inverter; and
    a modulation module configured to modulate the output voltage of the inverter using one or more modulation schemes, wherein the modulation module receives a local voltage reference as an input, wherein the local voltage reference is based on the global current measurement value such that the modulation module is configured to regulate the one or more output currents of the inverter based on the global current measurement value,
    wherein each power converter further comprises a processor or circuitry configured to adjust the local voltage reference after being output from a current loop of the power converter and before being input to the modulation module, the adjustment based on the one or more output currents of the respective inverter, and to alleviate differences in output currents between the motor drives operating in parallel.

2. The system as claimed in claim 1, wherein the input voltage is a DC input voltage and the output voltage is a three-phase output voltage.

3. The system as claimed in claim 1, wherein each local current measurement value is transmitted to and shared with the central controller to facilitate operation of the parallel configuration of power converters, wherein the global current measurement value is used to regulate the one or more output currents of each power converter locally such that the power converters in the parallel configuration act together to provide power to the one or more motors.

4. The system as claimed in claim 1, wherein the global current measurement value corresponds to a summation of the local current measurement values.

5. The system as claimed in claim 1, wherein the global current measurement value corresponds to an average of the local current measurement values.

6. The system as claimed in claim 1, wherein each modulation module is configured to generate appropriate switching signals for the respective inverter of each power converter to provide a controlled commutation of the output voltage thereof.

7. The system as claimed in claim 6, wherein each modulation module is configured to send the switching signals to the inverter so as to control timings of the output voltage in use.

8. The system as claimed in claim 7, wherein the generation of the switching signals for the inverters by each respective modulation module is based on the local voltage reference.

9. The system as claimed in claim 1, wherein each power converter is a single power converter and its circuitry/components are located on a single circuit board.

10. The system as claimed in claim 9, wherein the circuit boards holding the power converters comprise a common interface for communicating with the central controller.

11. The system as claimed in claim 10, further comprising a structure configured to receive and hold multiple of the circuit boards holding the power converters, wherein the structure is configured to connect any circuit boards held and received within the structure to the central controller such that a variable number of power converters may be connected to the central controller using the structure as desired.

12. The system as claimed in claim 11, wherein the structure is configured such that a single power converter can be connected thereto for providing power to the one or more motors in a standalone configuration, as well as up to N power converters connected thereto for providing power to the one or more motors in a parallel configuration, wherein N is an integer greater than 1.

13. The system as claimed in claim 1, wherein the circuitry of each power converter comprises one or more sensors for measuring and/or determining current values of the output voltage.

14. The system as claimed in claim 1, wherein the circuitry of each power converter is configured to convert current values of the output voltage to a synchronous reference frame current.

15. The system as claimed in claim 1, wherein the current loop and modulation module of each power converter combine to regulate the one or more output currents of the respective power converter, wherein each local current measurement value is transmitted to the central controller, which calculates the global current measurement value using the local current measurement values, wherein the global current measurement value is then transmitted back to each power converter by the central controller and is subsequently used by the current loop in each power converter to generate the local voltage reference for the modulation module which regulates the one or more output currents.

16. A system for providing power to one or more motors, comprising:
- a plurality of power converters, wherein each power converter is a motor drive configured to be arranged in a parallel configuration with one or more additional power converters so as to provide power to the one or more motors; and
- a central controller configured to receive a plurality of local current measurement values from each of the power converters, output a global current measurement value based on the local current measurement values, and transmit the global current measurement value to each of the power converters, wherein each power converter comprises:
an inverter for receiving an input voltage and converting this to an output voltage having one or more associated output currents;
circuitry configured to output a local current measurement value for transmission to the central controller, wherein the local current measurement value is based at least in part on the one or more output currents of the inverter; and
a modulation module configured to modulate the output voltage of the inverter using one or more modulation schemes, wherein the modulation module receives a local voltage reference as an input, wherein the local voltage reference is based on the global current measurement value such that the modulation module is configured to regulate the one or more output currents of the inverter based on the global current measurement value, wherein each power converter includes components or circuitry that form a speed loop having as an input a reference speed and also a motor speed, wherein the reference speed is provided by the central controller to all power converters operating in parallel, wherein each speed loop is configured to generate a suitable reference, which is then input into a current loop of each power converter, wherein each current loop is configured to regulate the one or more output currents of the power converter and a speed of rotation of at least one of the one or more motors.

17. The system as claimed in claim 16, wherein the global current measurement value transmitted to each of the power converters is received within the current loop of each power converter.

18. The system as claimed in claim 17, wherein each current loop is configured to generate the local voltage reference based on the global current measurement value, which local voltage reference is then transmitted to the modulation module to generate suitable modulation duty cycles.

19. The system as claimed in claim 18, wherein each power converter further comprises a processor or circuitry configured to adjust the local voltage reference after being output from the current loop and before being input to the modulation module, the adjustment based on the one or more output currents of the respective inverter, and to alleviate differences in output currents between the motor drives operating in parallel.

* * * * *